United States Patent
Delo et al.

(10) Patent No.: US 6,363,499 B1
(45) Date of Patent: Mar. 26, 2002

(54) METHOD AND SYSTEM FOR RESTORING A COMPUTER TO ITS ORIGINAL STATE AFTER AN UNSUCCESSFUL INSTALLATION ATTEMPT

(75) Inventors: John C. Delo, Bellevue; Benjamin Chamberlain, Redmond, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/158,124

(22) Filed: Sep. 21, 1998

(51) Int. Cl.[7] .................. G06F 11/36; G06F 15/177; G06F 9/445
(52) U.S. Cl. .................................. 714/15; 717/11
(58) Field of Search .................. 714/15, 2; 717/1, 717/11, 4; 713/1, 2; 707/200, 203; 711/161

(56) References Cited

U.S. PATENT DOCUMENTS

| | | | | |
|---|---|---|---|---|
| 5,008,814 A | * | 4/1991 | Mathur |
| 5,872,979 A | * | 2/1999 | Edel et al. |
| 6,141,683 A | * | 10/2000 | Kraml et al. |
| 6,151,643 A | * | 11/2000 | Cheng et al. |
| 6,161,218 A | * | 12/2000 | Taylor |

OTHER PUBLICATIONS

Kelly, M., "Gain Control of Application Setup and Maintenance with the New Windows Installer", Microsoft Systems Journal: Sep. 1998, pp. 15–27.

* cited by examiner

Primary Examiner—Gopal C. Ray
(74) Attorney, Agent, or Firm—Christensen O'Connor Johnson & Kindness PLLC

(57) ABSTRACT

A system and method for creating rollback scripts for operations performed by an installer program module. A rollback script may be used to reverse an action of an installer program module so that a user's machine is restored to its original state, i.e., the state before the installer program module began performing operations. In performing operations, the installer program module typically generates installation script records of specific actions that are to be performed to a particular machine with regard to installation data. During the processing of each installation script record, an inverse record is created, known as a rollback script record. When installing a file, if there is no file with the same name in the same location stored on the machine, then a rollback script record describing how to delete the file is stored. However, if an old file stored in the same location does exist, then the old file is backed up to another location and a rollback script record is saved describing how to copy the old file back to its prior location on the machine.

15 Claims, 7 Drawing Sheets

*Fig.5A.*

```
Header(Signature=1397708873,Version=28,Timestamp=0,LangId=0,,ScriptType=1,ScriptMajorVersion=20,ScriptMinorVersion=0)
FileCopy(SourceName=e:\source\foo.exe,DestName=e:\test\foo.exe,Attributes=0,FileSize=100,Version=1.0.0.0,Language=1033,InstallMode=58982400,PerTick=20,IsCompressed=0,,,)
RegOpenKey(Root=-2147483646,Key=Software\Microsoft\Test,)
RegAddValue(Name=TestName,Value=TestValue)
End(Checksum=0,ProgressTotal=0)
```

*Fig.5B.*

```
Header(Signature=1397708873,Version=28,Timestamp=620460155,LangId=0,,ScriptType=2,ScriptMajorVersion=20,ScriptMinorVersion=0)
RegisterBackupFile(File=e:\Config.Msi\5b9f584d.rbf)
FileCopy(SourceName=e:\Config.Msi\5b9f584d.rbf,DestName=e:\test\foo.exe,Attributes=32,FileSize=9,,,InstallMode=4194308,PerTick=0,IsCompressed=0,,VerifyMedia=0,,)
FileRemove(,FileName=e:\test\foo.exe)
RegOpenKey(Root=-2147483646,Key=Software\Microsoft\Test,)
RegAddValue(Name=TestName,Value=OldValue)
RegRemoveValue(Name=TestName,Value=TestValue)
End(Checksum=0,ProgressTotal=0)
```

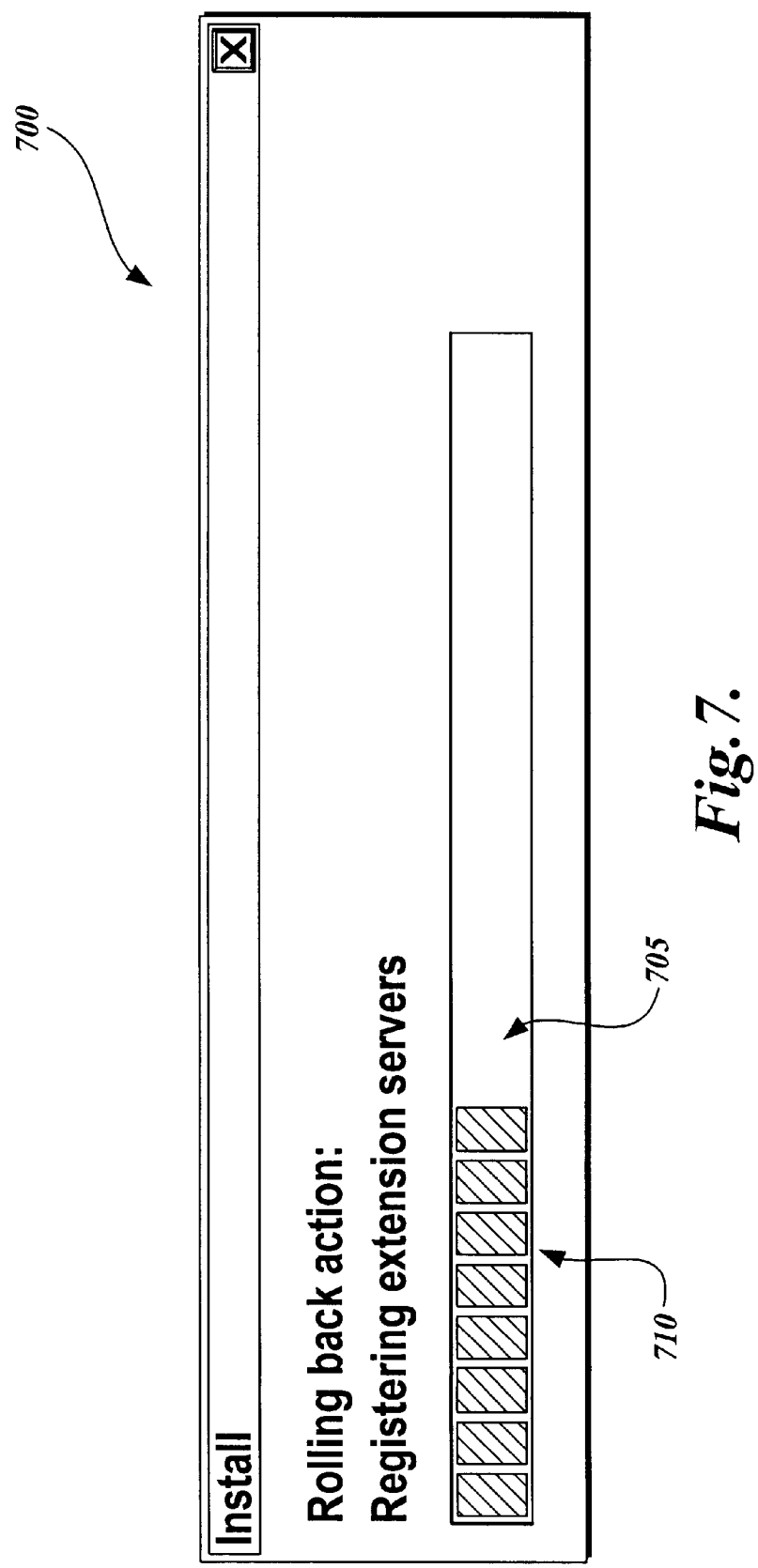

METHOD AND SYSTEM FOR RESTORING A COMPUTER TO ITS ORIGINAL STATE AFTER AN UNSUCCESSFUL INSTALLATION ATTEMPT

REFERENCE TO RELATED APPLICATIONS

This application is related to the following applications, all of which are assigned to the same assignee as the present application: "Use of Relational Databases for Software Installation"—Ser. No. 09/158,125, filed Sep. 21, 1998; "System and Method or Repairing a Damaged Application"—Ser. No. 09/158,126, filed Sep. 21, 1998; "A Method for Categorizing and Installing Selected Software Components"—Ser. No. 09/157,695, filed Sep. 21, 1998; "System and Method for Managing Locations of Software Components via a Source List"—Ser. No. 09/157,974, filed Sep. 21, 1998; "Method for Optimizing the Installation of a Software Product onto a Target Computer System"—Ser. No. 09/157,853, filed Sep. 21, 1998; "Software Installation and Validation Using Custom Actions"—Ser. No 09/157,776, filed Sep. 21, 1998; "Internal Database Validation"—Ser. No. 09/157,828, filed Sep. 21, 1998; "Management of Non-Persistent Data in a Persistent Database"—Ser. No. 09/157,883, filed Sep. 21, 1998; "Method and System for Advertising Applications"—Ser. No. 09/158,967, filed Sep. 21, 1998, and "Software Implementation Installer Mechanism"—Ser. No. 09/158,021, filed Sep. 21, 1998.

TECHNICAL FIELD

This invention relates to installer program modules for installing a computer program module onto a computer. More particularly, this invention relates to a method and system for restoring a computer to its original state after an unsuccessful installation attempt of an application program module by an installer program module.

BACKGROUND OF THE INVENTION

Sometimes, errors may occur when an installer program module is installing an application program module onto a computer. For example, a user may attempt to download an upgrade to an application program module while connected to the Internet via a modem. The modem connection may become disconnected at some point after the download has begun. The user may attempt to reconnect to his Internet service provider and restart the download. However, without reconnecting to the Internet and restarting the download, then the user's computer may be left in a state such that the application program module that the user was attempting to upgrade is unusable. Thus, the user may wish to return his computer to its state prior to the download attempt. However, this is not an option using prior installer program modules. Typically, prior installer program modules delete files and save updated files such that it is impossible to return the computer to its previous state.

At times, an installation does not fail, but instead is aborted by the user. For example, a user may terminate an installation before it is complete, such as by selecting a Cancel button. The user may wish to return his computer to the state it was in prior to the aborted installation. Thus, there is a need for a method and system for returning a computer to the state it was in prior to a failed or aborted installation.

After a failed or aborted installation attempt, the user may want to begin the installation again at the point that the installation failed or was aborted. Using prior installer program modules, an installation starts from the beginning and must be completed entirely in one installation. In other words, even if most of the installation process has been completed in a prior failed installation attempt, the entire installation must be performed in a second installation attempt. Thus, there is a need for an installer program module that allows a user to begin installation at the point of failure of a prior failed installation so that dialogs requesting information already entered in a prior installation attempt may be bypassed.

Sometimes, installations of application program modules are performed by administrators deploying the application program module over a network. These administrators are not able to return the machines on the network to their previous state should an installation fail. Thus, there is a need for an installer program module that allows a network administrator to deploy an application program module to machines on a network while allowing for the return of the machines to a previous state should an installation failure or abortion occur.

Thus, there is a need for a method and system for installing an application program module that returns a computer to the state it was in prior to a failed or aborted installation. There is a further need for a method and system for installing an application program module that allows a user to begin installation at the point of failure of a prior failed installation. There is still a further need for a method and system for installing an application program module that allows a network administrator to install the application program module to machines on a network while allowing for the return of the machines to a previous state should an installation failure or abortion occur.

SUMMARY OF THE INVENTION

The present invention satisfies the above described needs by providing a method and system for "rolling back" a computer, i.e., restoring a computer to its original state after a failed or aborted installation attempt of an application program module. In one aspect, a rollback script may be used to reverse an action of an installer program module so that a user's machine is restored to its original state, i.e., the state before the installer program module began performing operations.

In performing operations, the installer program module typically generates installation script records of specific actions that are to be performed to a particular machine with regard to installation data. During the processing of each installation script record, an inverse record is created, known as a rollback script record. When installing a file, if there is no file with the same name in the same location stored on the machine, then a rollback script record describing how to delete the file is stored. However, if an old file stored in the same location does exist, then the old file is backed up to another location and a rollback script record is saved describing how to copy the old file back to its prior location on the machine.

In another aspect, the present invention is a user interface displayed to the user when "rolling back" an installation operation. The user interface may include a rollback bar with a number of level indicators. The level indicators appear in the rollback bar and are typically rectangles that are removed as the rollback operation is completed. When the rollback operation is completed, there are typically no level indicators displayed in the rollback bar.

In still another aspect, the present invention is a method for determining whether to enable "rollback". The cost of installing an application program module and the cost of storing corresponding rollback script records and corresponding backed-up rollback files is determined. It is determined whether the cost of installing the application program module and the cost of storing the rollback script records and backed-up rollback files is greater than the available disk space of the computer. If so, then the application program module is installed while storing the rollback script records and backed-up rollback files. In other words, "rollback" is enabled.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 5A is a textual representation of an installation script record in accordance with an embodiment of the present invention.

FIG. 5B is a textual representation of a rollback script record in accordance with an embodiment of the present invention.

FIG. 7 is a screenshot illustrating the preferred user interface displayed to the user when "rolling back" an installation operation in accordance with an embodiment of the present invention.

DETAILED DESCRIPTION

Figure 1:
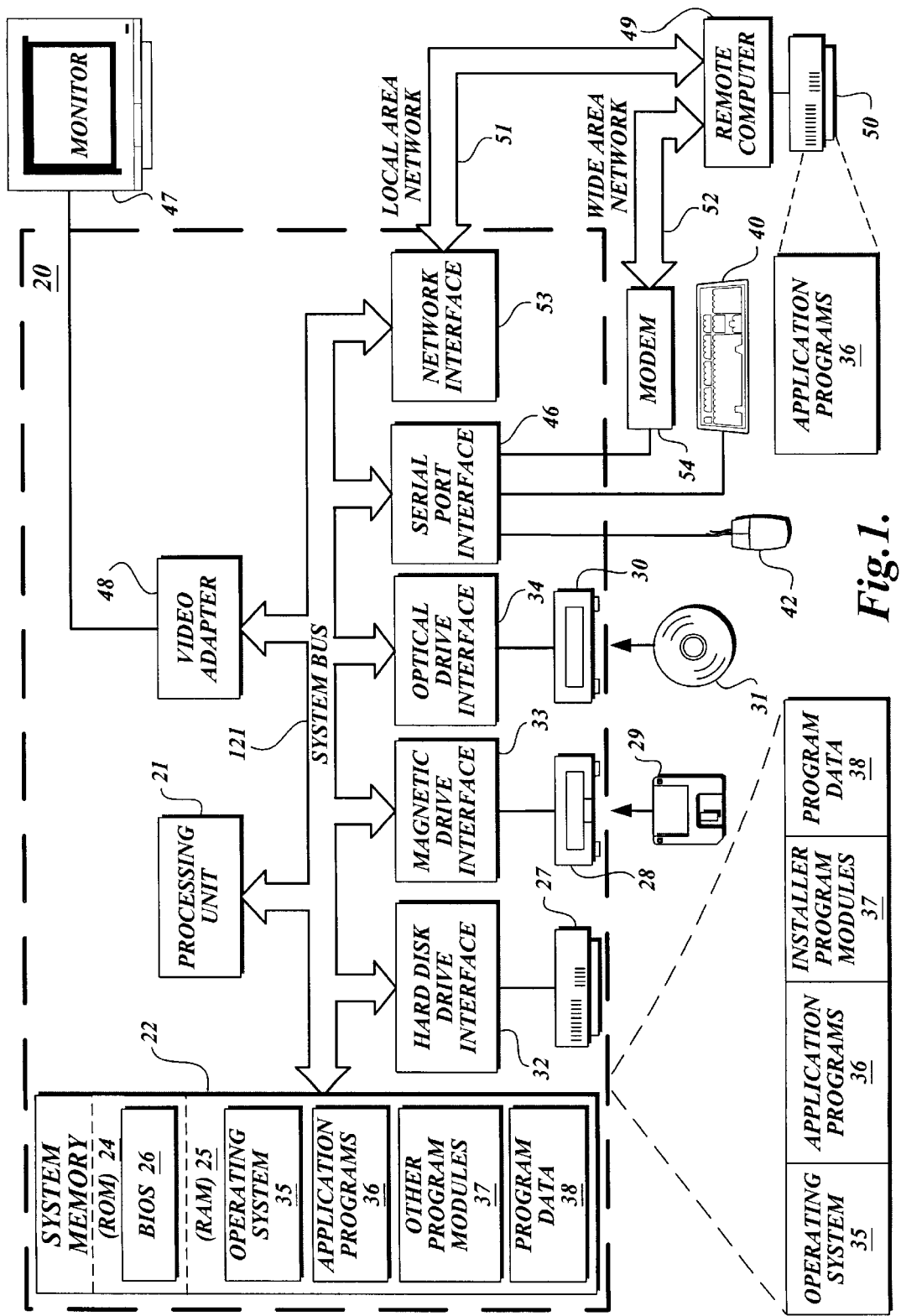
FIG. 1 is a block diagram of a computer that provides the exemplary operating environment for the present invention.

The present invention is directed to a method and system for restoring a computer to its original state after a failed or aborted installation attempt of an application program module. In one embodiment, the invention is incorporated into a preferred installer program module entitled "WINDOWS INSTALLER", marketed by Microsoft Corporation of Redmond, Wash. Briefly described, the preferred installer program allows a user to install application program modules onto a computer. The preferred installer program module includes a "rollback" aspect which allows the user to restore his computer to its original state should an installation of a program module fail or be aborted. The rollback aspect is provided as a recovery mechanism in the event of a failed installation or maintenance operation. Before any operation is performed, the preferred installer program module enables the rollback aspect. If a failure should occur, the preferred installer program module can provide the user with an opportunity to resume where the operation left off or "rollback" to the state of the machine prior to initiation of the operation.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an installer program module that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21 The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an installer program module 37, program data 38, and other program modules (not shown). The installer program module 37 may include a rollback aspect that will be described below.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. I include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having briefly described the exemplary operating environment, a functional block diagram of a computer environment making use of an installer program module constructed in accordance with an exemplary embodiment of the present invention will be discussed below in reference to FIG. 2.

Discussion of Terminology

Figure 2:
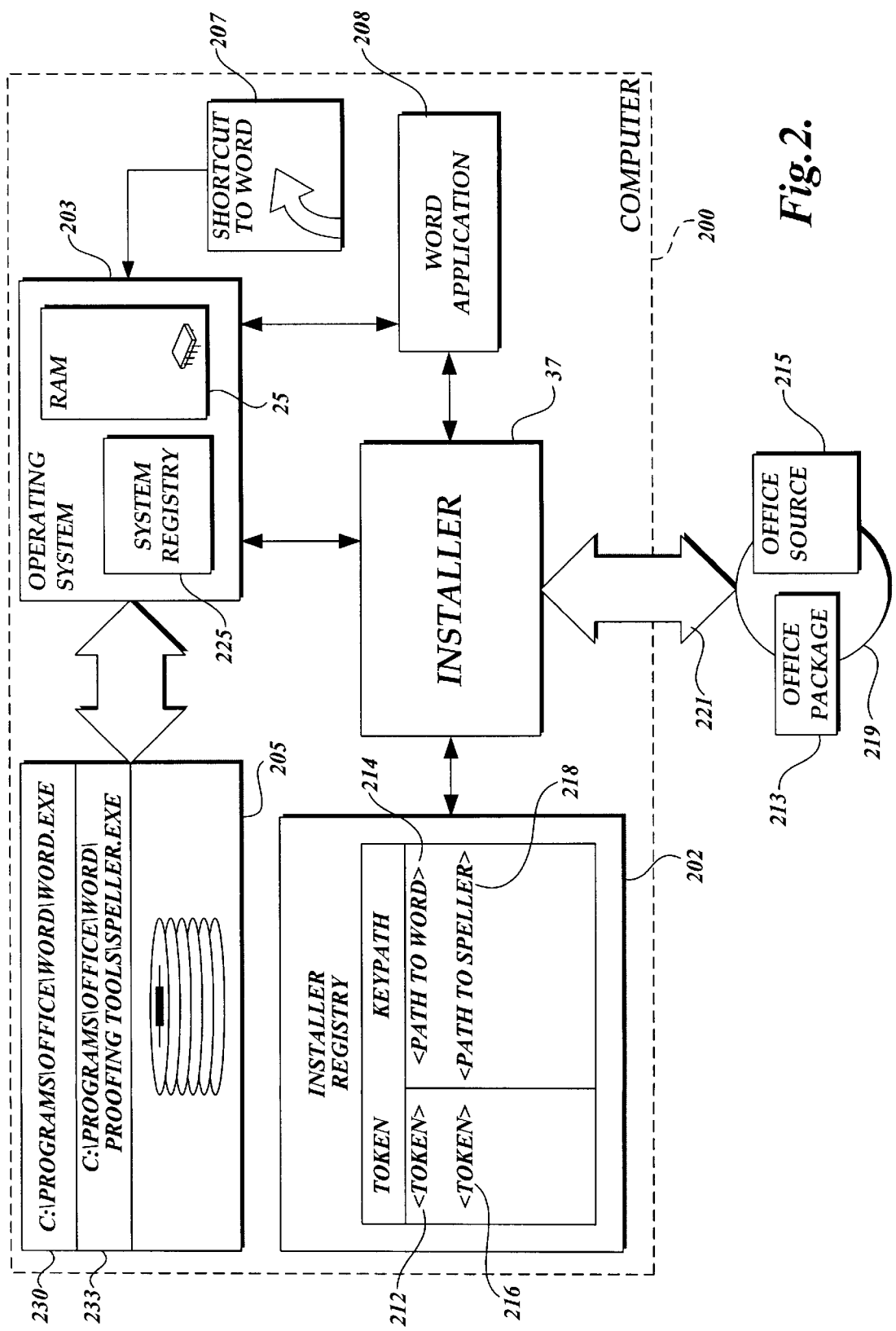
FIG. 2 is a functional block diagram of a computer environment making use of an installer application constructed in accordance with an exemplary embodiment of the present invention.

Before discussing FIG. 2, a brief discussion of terminology is needed. In accordance with an exemplary embodiment of the present invention, the installer program module 37 recognizes three principal elements: products, features and components. The installer program module 37 is also described in co-pending application Ser. No. 09/158,125, filed Sep. 21, 1998, entitled "Use of Relational Databases for Software Installation", which is assigned to the same assignee and filed on the same day as the present invention, and incorporated by reference herein. A "product" represents a single, entire application program, such as the "MICROSOFT OFFICE" application program marketed by Microsoft Corporation of Redmond, Wash. Each product has a globally unique identifier known as a Product Code which allows each product to be distinguished. Each product is made up of one or more features. A feature is a granular piece of the product that a user may choose to install or execute. Features typically correspond roughly to the functional features of the product itself, such as a "Proofing Tools" feature or a "WORD" feature. Each feature is essentially a grouping of components and may also include other features. Features need not be globally unique, and therefore may be identified by any appropriate means, such as with a textual feature identifier.

A component is a collection of resources, such as files or registry keys, that are all installed or uiinstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. One resource within the component is designated as a key file. The key file may be any resource, such as a file or registry key, within the component.

FIG. 2 is a functional block diagram of a computer environment making use of an installer program module 37 constructed in accordance with an exemplary embodiment of the present invention. A computer 200 is illustrated, such as conventional personal computer 20, including the installer program module 37, an installer registry 202, an operating system 203, a hard-disk drive 205, a shortcut 207, and an executing application 208. Each of those items is described and discussed in greater detail below.

Also illustrated are a package file 213 and a source 215. The package file 213 and the source 215 may reside on a CD-ROM disk 219 accessible to the computer 200 via an optical disk drive 30. The package file 213 references the source 215 relative to the location of the package file 213 itself, so this fixed relationship requires that the source 215 reside at the same location as the package file 213. For instance, the source 215 may reside on CD-ROM disk 219 and the package file 213 may reside on remote computer 49 accessible via local area network 51 or via wide area network 52. The package file 213 and the source 215 are discussed in further detail below. The functionality and construction of the installer program module 37 is best described by example, through the installation and execution of a product.

Example of Installation Procedure

To begin the example, a user initiates the installation of the product, such as the "MICROSOFT OFFICE" application program. Initiating the installation may constitute the act of inserting CD-ROM disk 219 in optical disk drive 30, or the act of executing a remote startup script over a network connection, or any other means of initiating the installation. Once the installation is initiated, the installer program module 37 assumes control of processing.

The installer program module 37 begins the installation by reading the package file 213 into memory, such as RAM 25. The package file 213 is unique to the product and is essentially a database which describes, among other things, the relationships between the features, components, and resources of the product. The package file 213 may include the unique identifiers assigned to each of the features and components of the product.

The installer program module 37 reads the package file 213 and uses the information stored within to determine the installation operations that must be performed for the product. For instance, the installer program module 37 may display a dialog box which presents the user with the option of selecting which features of the product to install. The user may be presented with the option of selecting a "WORD" feature, an "EXCEL" feature, and a "Proofing Tools" feature. The user may then select which features to install to the computer 200. As discussed above, a feature is a grouping of components, and the components identify the actual resources to be installed to the computer 200. Accordingly, once the user has selected the desired features of the product, the installer program module 37 resolves those features into a listing of components to be installed.

The source 215 contains the files. Other resources such as registry keys are described completely in the package file and require no external source information. The source 215 may also include a reference table to identify the associations between the resources and the components. Those components making up the selected features are copied from the source 215 to an appropriate location on the computer 200, such as to the hard-disk drive 205 or to a system registry 225 maintained by the operating system 203. As mentioned above, a component is a collection of resources, such as files, shortcuts, or registry keys. Those skilled in the art will recognize that the phrase "reading the component" may actually refer to reading the resources associated with the component. Likewise, the phrase "writing the component" may refer to writing the resources associated with the component. However, for simplicity only, this discussion may use the terms reading, writing, or copying components interchangeably with performing those actions on the underlying resources.

The appropriate location for a component on the computer 200 may depend upon the type of resources associated with the component. For instance, if the component includes files, the component may be stored in the file system of the hard-disk drive 205. However, if the component includes registry keys, the component may be stored in the system registry 225. In addition, a component may include both files and registry keys, in which case files are stored in the file system of the hard-disk drive 205 and the registry keys are stored in the system registry 225. If the user identifies a particular location within the file system of the hard-disk drive 205 for a feature, then the installer program module 37 will write the files of components associated with that feature to that particular location.

When a component is written to the appropriate location, the installer program module 37 creates an entry in the installer registry 202 corresponding to the component. The entry includes an identifier for the component, termed a token, and a keypath for the component. The token includes the Product Code of the product installing the component and the Component Code of the component. Those skilled in the art may appreciate that a usage counter may be included to identify the number of features requiring a component. For instance, if more than one feature requiring a component is installed, the usage counter may prevent the component from being deleted if only one such feature is uninstalled.

The keypath entry may be a path in the file system where the component is actually stored. For instance, in the disclosed example, the product installed may include a "WORD" feature having a "WORD" executable component. The "WORD" executable component may have the key file "word.exe" 230. The "WORD" feature may also include a "Proofing Tools" feature, which is actually a sub-feature. As mentioned above, a feature may include subfeatures. The "Proofing Tools" feature may include a Spelling Component. The Spelling Component may have the key file "speller.exe" 233.

Continuing with the example, the "WORD" executable component may be installed to the location on the hard-disk drive 205 identified by the path "C:\Programs\Office\Word\." Accordingly, the word.exe 230 key file is written to that location, and an entry in the installer registry 202 includes a token 212 identifying the "WORD" executable component and the keypath 214 to the word.exe 230 key file. In similar manner, the Spelling Component may be written to the path "C:\Programs\Office\Word\Proofing Tool\," and an entry in the installer registry 202 may be created with a token 216 identifying the Spelling Component, and a keypath 218 to the speller.exe 233 key file.

The installer program module 37 continues with the installation process until all of the components making up the selected features are written to the appropriate location on the computer 200. When all of the components are written, installation is complete and the installer registry 202 is populated with an entry for each installed component. Each entry includes an identifier for the component (the token) and a keypath identifying the location to which the component is stored.

Example of Product Execution

The following discussion gives an overview of the functionality of the installer program module 37 once the product is installed. To review, the installer program module 37 installed the features of the product selected by the user at installation. The components making up those selected features were written to appropriate locations on the computer 200. For instance, a "WORD" executable component and a Speller Component were written to the file system of the hard-disk drive 205. As discussed above, installing those components may include writing the key files of those components to a keypath in the file system of the hard-disk drive 205.

Also during installation, a shortcut 207 to the "WORD" executable component was created. The shortcut 207 is an operating system 203 service which allows indirect access to a resource stored on the hard-disk drive 205. A shortcut is sometimes referred to as an alias. The shortcut 207 is generally presented to the user as an icon or file which, when activated, launches an executable file associated with the shortcut 207. In the disclosed example, the shortcut 207 is associated with the "WORD" executable component such that activating the shortcut 207 causes the operating system 203 to launch the key file associated with the "WORD" executable component, in this case the word.exe 230 executable file.

When the user activates the shortcut 207, the operating system 203 first instantiates a shell or process within which the executable file will execute. In accordance with the disclosed embodiment, the shortcut 207 then queries the installer program module 37 for the path to the executable file associated with the shortcut 207, in this case the path to the word.exe 230 executable file. The shortcut 207 may query for the path by passing to the installer program module 37 a "Provide_Component" call with a token identifying the Word Executable Component. In response to the Provide_Component call, the installer program module 37 queries the installer registry 202 for the keypath associated with the token. The installer program module 37 then returns the keypath to the component which is the target of the shortcut 207, which in turn prompts the operating system 203 to execute the word.exe 230 key file at the location identified by the keypath. As discussed above, the word.exe 230 key file is stored on the hard-disk drive 205 under the folder "C:\Programs\Office\Word\."

The operating system 203 executes the word.exe 230 key file from the location identified by the keypath. The word.exe 230 key file then assumes control of the shell instantiated by the operating system 203. While the word.exe 230 key file is executing, it is referred to as the "WORD" application 208. The "WORD" application 208 may then perform a startup procedure and continue loading. For instance, the "WORD" application 208 may issue a series of "Query Feature_State" calls to the installer program module 37 to identify which features of the "WORD" application 208 are installed. In response to such a call, the installer program module 37 may query the installer registry 202 to identify whether a particular feature of the "WORD" application 208 is installed, and return that information to the "WORD" application 208. The "WORD" application 208 may perform several such calls in order to populate a menu bar or toolbar of the "WORD" application 208. Once the startup procedure is complete, the "WORD" application 208 is available for use by the user.

During operation, the user may select a particular feature of the "WORD" application 208 for activation. For instance, the user may select a "spell check" option from the menu bar or toolbar of the "WORD" application 208. In response to such a selection, the "WORD" application 208 may query the installer program module 37 for the path to the component or components necessary to support the feature. For instance, in the disclosed example, a Spelling Component may be necessary to support the feature associated with the "spell check" option of the "WORD" application 208. In that case, when the user selects "spell check," the "WORD" application may pass a "Provide_Component" call to the installer program module 37 along with a token identifying the Spelling Component.

In response to the Provide_Component call, the installer program module 37 may verify the installed state of the calling feature identified in the token, and provide the keypath to the key file associated with the component identified in the token. In this example, the key file of the Spelling Component is the speller.exe 233 key file. Consequently, when the installer program module 37 receives a Provide_Component call with a token identifying the Spelling Component, the installer program module 37 queries the installer registry 202 for the keypath associated with that token. The installer program module 37 then returns the keypath to the "WORD" application 208, which then instructs the operating system 203 to execute the speller.exe 233 key file at the location identified by the keypath. Once the operating system 203 has launched the speller.exe 233 key file, the Speller Component is available to the "WORD" application 208. In this manner, the "WORD" application 208 may query the installer program module 37 each time the user attempts to activate another feature, and the installer program module 37 returns the keypath for the appropriate component.

The foregoing has been a general overview of the functionality of an installer program module 37 which may benefit from an exemplary embodiment of the present invention. The discussion will now explain in greater detail additional inventive aspects of the rollback aspect of the installer program module 37.

Rollback Aspect of the Installer Program Module

The installer program module 37 includes a rollback aspect that provides a method for restoring a computer to its original state after a failed or aborted installation attempt of an application program module. For example, if an installation is cancelled or an installation fails, then the rollback aspect of the present invention restores all the information to the computer that was on the computer before the installation began, even if that information may have been removed or changed during the installation.

For example, suppose a user is trying to install version 2 of an application and further suppose that version 1 of that application is already installed on the user's computer. During the installation of version 2, the installation may fail or be cancelled by the user so that some files of version 2 are installed on the user's computer along with the remaining files of version 1. Thus, version 2 is left in an unusable state. Moreover, version 1 is also typically left in an unusable state because even partial installation of version 2 often erases necessary files.

The rollback aspect allows a user to "rollback" their computer to the state it was in prior to the failed or aborted installation. The rollback aspect "rolls back" the information on the computer to the state it was in prior to a failed or aborted installation. In other words, with regard to the above-described example, rollback allows a user to return all of the version 1 information to his computer so that the application is still usable.

Figure 3:
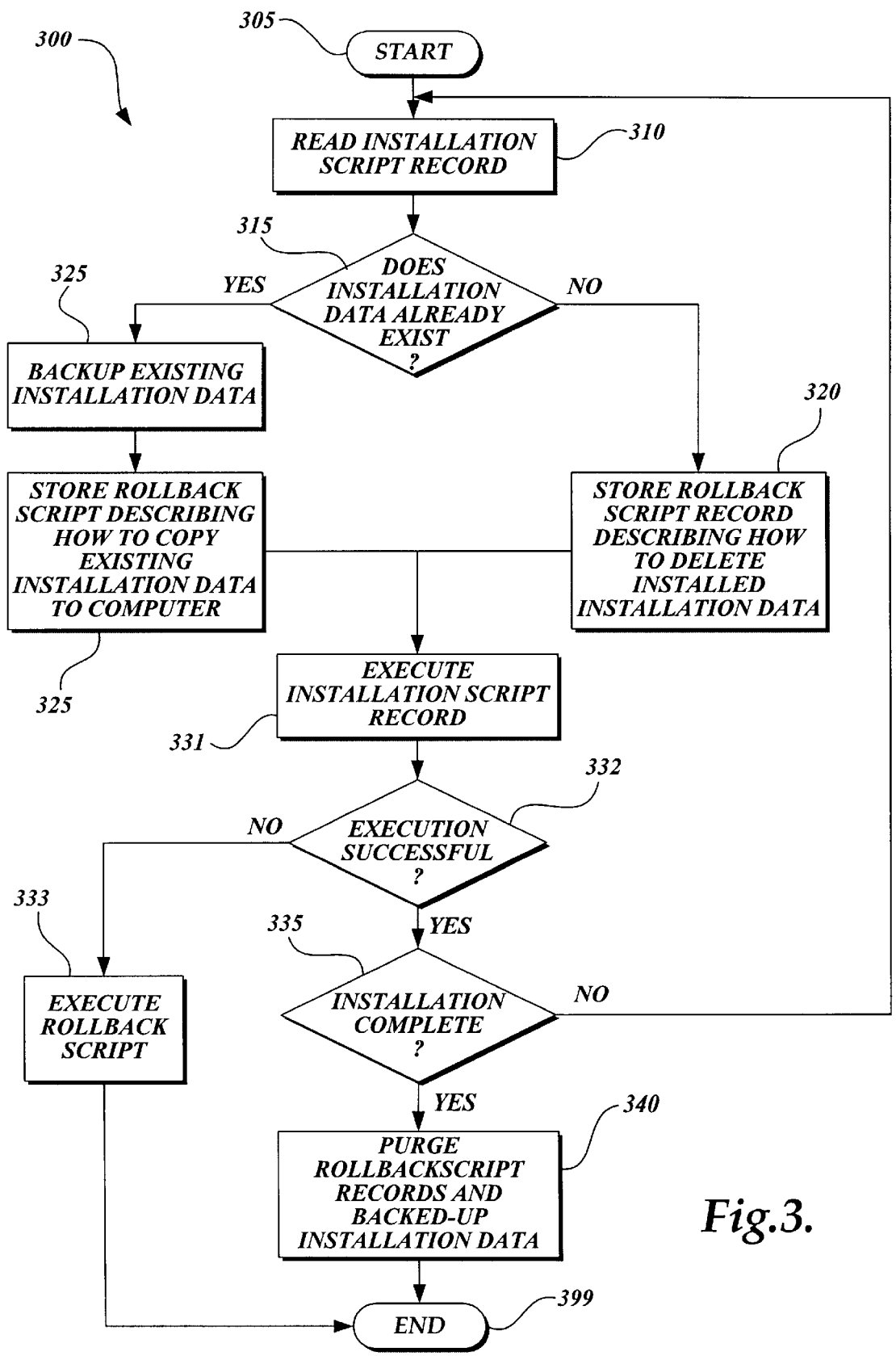
FIG. 3 is a flowchart illustrating a method for restoring a computer to its original state after a failed or aborted installation attempt of an application program module in accordance with an embodiment of the present invention.

Referring now to FIG. 3, a flowchart illustrating a method 300 for restoring a computer to its original state after a failed or aborted installation attempt of an application program module in accordance with an embodiment of the present invention will be described. Those skilled in the art will appreciate that this exemplary embodiment is a computer-implemented process that is carried out by the computer in response to input from the user and instructions provided by a program module.

At step 305, the method 300 begins and proceeds to step 310 where an installation script record for installing a part of the application program module is read, or processed. The original decision to install may be made in a variety of ways. For example, the user may trigger an installation, an application program module may trigger an installation, the operating system may trigger an installation, and the installer program module may trigger an installation in response to certain requests made by the operating system, application program module, or user. Regardless, the installation script operations are typically generated by the installer program module. These instructions are generally in the form of an installation script, An installation script is a set of installation script records. These installation script records typically are instructions to remove or add certain installation data, such as files, etc. For example, one installation script record may be to save a certain file onto the user's computer and a second installation script record may be to remove certain files from the user's computer.

As described above, an installation script typically includes a set of records known as installation script records describing specific actions to apply to a particular machine. For example, the installation script may contain records describing the following actions: writing a registry value with the name "foo" and data "Bar" under key "HKLM/Software/FooWare", installing a file named foo.exe into a folder called "C:\ProgramFiles\FooWare", and creating a shortcut named "FooWare BarExpress" in the "%USERPROFILE%\Programs" folder pointing to foo.exe. During the processing of each installation script record, the preferred installer program module creates an inverse record, called a rollback script record, and analyzes the installation script record at step 310. The generation and content of these installation script records is further described in U.S. patent application Ser. No. 09/158,125, entitled "Use of Relational Databases for Software Installation", filed Sep. 21, 1998 and assigned to a common assignee, which was incorporated by reference above. Installation script records are also further described below.

After an installation script record is analyzed to create a rollback script record at step 310, the method 300 proceeds to decision step 315. It is determined whether the installation data in the processed installation script record already exists at decision step 315. As mentioned above, installation script records typically are instructions to remove or add certain installation data, such as files. Decision step 315 is a determination of whether that installation already exists, such as whether another version of the file being installed already exists.

If, at decision step 315, it is determined that the installation data in the processed installation script record does not already exist, then the method 300 proceeds to step 320.

However, if, at decision step 315, it is determined that the installation data in the processed installation script record already exists, then the method proceeds to step 325.

At step 320, the rollback script record created at step 310 is stored. The rollback script record typically includes instructions on how to delete the installed installation data of the installation script record processed at step 310. For example, if there is no value named "foo" under the "HKLM\Software\FooWare" key, then the rollback script record describes how to remove the "foo" value. The method then proceeds to step 331.

Returning now to decision step 315, if it is determined that the installation data to be installed already exists, then the method proceeds to step 325. At step 325, the existing installation data is stored in another location. For example, if there is already a value named "foo", the rollback script record saves, or backs up, the existing value data so that it can be restored later, if necessary. It should be understood that if the data that needs to be backed up is a file, then the file needs to be backed up at a different locations that its current storage location. However, if the data is simply a registry key or shortcut, for instance, then the rollback script record stored at step 330 (described below) fully describes the information needed and the rollback script record is sufficient. The method 300 then proceeds to step 330. At step 330, a rollback script record is stored. Typically, the rollback script record stored at step 330 includes instructions describing how to copy the existing installation data, i.e., the backed-up installation data, to its prior location and delete the installed installation data. The method 300 then proceeds to step 331.

At step 331, the installation script record is executed to perform the installation function defined by the installation script record. The method then proceeds to decision step 332.

At decision step 332, it is determined whether the installation script record executed successfully. If so, then the method proceeds to decision step 335. However, if the installation script record does not execute successfully, then the method proceeds to step 333.

At step 333, the rollback script, including all of the rollback script records, is executed to "rollback" the unsuccessful installation. The method then ends at step 399.

Returning to decision step 332, if the installation script record is executed successfully, then the method proceeds to decision step 335.

At decision step 335, it is determined whether the installation operation is complete. If not, then the method returns to step 310 and the next installation script record is processed and the next rollback script record is created. However, if at decision step 335, it is determined that the installation operation is complete, then the method 300 proceeds to step 340.

At step 340, the rollback script records and backed-up installation data are purged. The method then ends at step 399.

Thus, as described above in reference to FIG. 3, when performing an installation, the installer program module 37 typically copies files and writes to a registry. At each point when the preferred installer program module is about to modify the computer, such as by copying a file or writing a registry value, the installer program module 37 first checks to determine whether certain installation data, such as files are already stored on the computer.

For example, when copying a file, an embodiment of the present invention determines whether a file of that same name already exists and, if so, then it copies, or backs up, that existing file to another location. Typically, the file is copied to a folder called config.msi at the root of the same drive where the file was originally stored. The folder is typically marked hidden in the system so that the user never sees it. Information is stored in rollback script records that will allow the preferred installer program module to put back the backed-up installation data if necessary.

Thus, while installing, the present invention analyzes the current state of the machine and records whatever information is necessary to return to that state if necessary. When the installation is cancelled or otherwise fails, the present invention can restore the original state of the machine.

Rollback Scripts and Rollback Script Records

Typically, for any installation transaction, an installation script is generated that includes one or more installation script records. Each installation script record includes instructions for installing, or performing some other action, on a certain piece of installation data. For example, an installation script record may include instructions for installing the file "foo.exe".

The preferred installer program module 37 is capable of creating a rollback script for every transaction submitted to it. The rollback script is a set of instructions for reversing the transaction that is submitted to the installation service. Thus, a rollback script is capable of reversing the actions of an installation script, thereby restoring a machine to its previous state, i.e., the state of the machine before the actions of the installation script were undertaken.

As described above, an installation script typically includes one or more installation script records. Similarly, a rollback script record typically includes one or more rollback script records. Preferably, rollback script records are stored in a binary format and define one or more operations to be performed.

Figure 4:
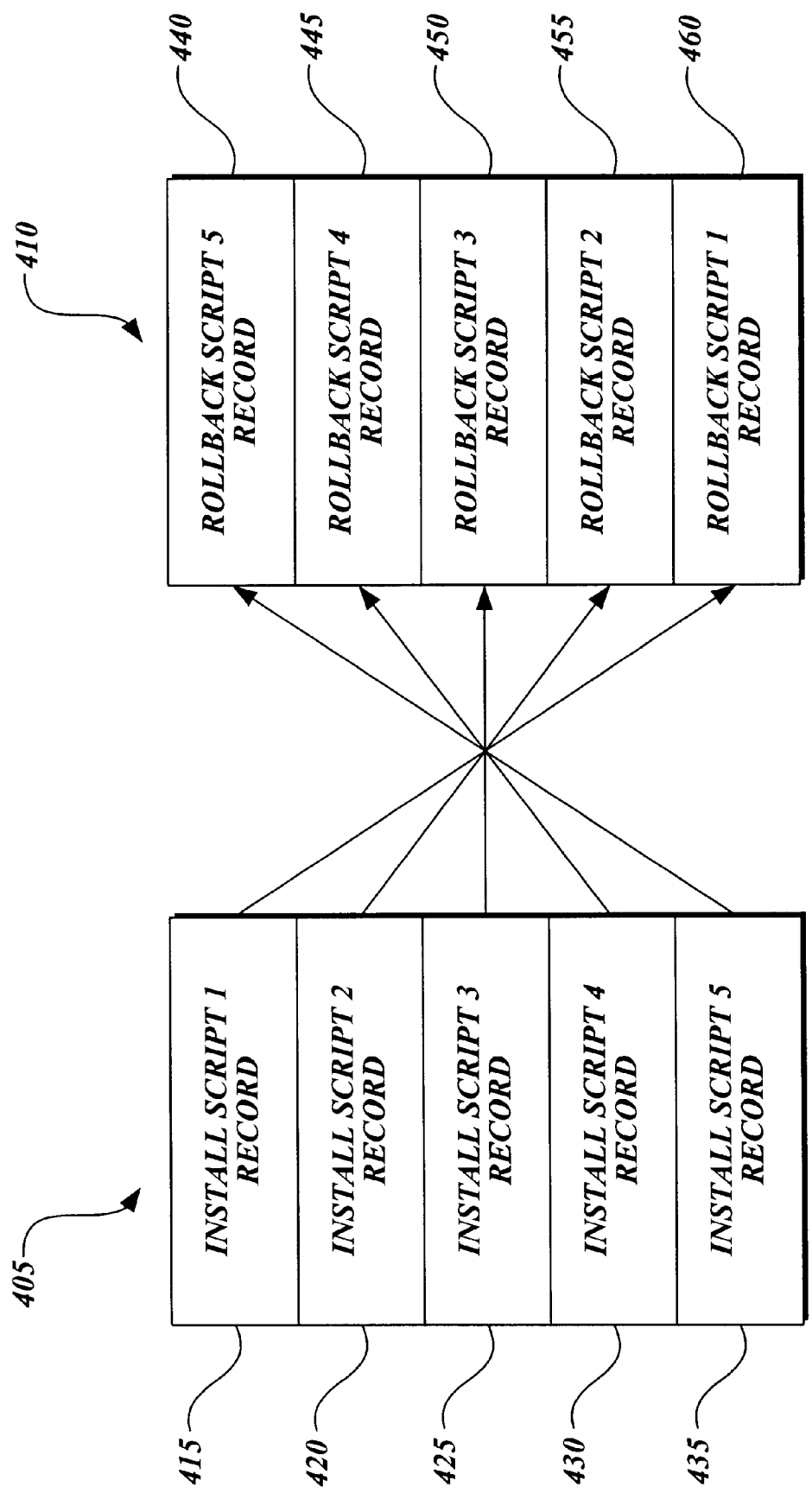
FIG. 4 is an illustration of an installation script and rollback script.

Referring now to FIG. 4, an installation script 405 and rollback script 410 are illustrated. The installation script 405 includes installation script record 1 415, installation script record 2 420, installation script record 3 425, installation script record 4 430, and installation script record 5 435. The rollback script 410 includes rollback script record 1 440, rollback script record 2 445, rollback script record 3 450, rollback script record 4 455, and rollback script record 5 460. The arrows in FIG. 4 illustrate the associations between the installation script records and the rollback script records. For example, installation script record 1 415 is associated with rollback script record 1 460. Thus, rollback script record 1 460 includes instructions for reversing the operation defined by installation script record 1 415. As further illustrated in FIG. 4, the installation script 405 and the rollback script 410 are executed from top to bottom. Thus, when rolling back an installation operation, rollback script record 5 440 is executed first when "rolling back" the installation operation performed by installation script 405.

Each rollback script record typically is a stream of data containing an opcode, an argument count, and an array of arguments. The opcode is a number which corresponds to the particular type of operation performed by the rollback script record, such as whether the operation of the rollback script record is to copy a file. For the preferred installer program module 37, there are approximately sixty operations that may be performed by a rollback script record, such as file copy, write registry value, remove file, remove shortcut, and remove registry value.

Each rollback script record also includes an argument count which is an indicator of the size of the remainder of the operation, i.e., the number of bits that follow the argument count. The remainder of the operation is the rest of the information needed. For example, if the operation is file copy, then the first parameter, or argument, may be the path to the folder that is copied to the file. The second parameter, or argument, may be the name of the file.

As illustrated in FIG. 5A, a textual representation of an installation script record 505 in accordance with an embodiment of the present invention is shown. The installation script record 505 copies a file and writes a registry value. As illustrated in FIG. 5B, a textual representation of a rollback script record 510 in accordance with an embodiment of the present invention is shown. The rollback script record 510 was generated during execution of the installation script record 505. In this example, an older file already existed, so the rollback script record 510 copies back the older file and rewrites an older registry value.

Thus, it should be understood that a rollback script is a file containing a linear sequence of operations to perform such as file and registry updates, configuration information updates, user interface notifications, and state information for other operations. Each operation in a rollback script is stored as a rollback script record and is created in response to an operation in an installation script record. For example, if an installation script record installs a file "foo.exe" in the folder "C:\ProgramFiles\FooWare", a corresponding rollback script record is created to remove this file. Should "foo.exe" already exist in "C:\ProgramFiles\FooWare" then the rollback script record contains information on how to restore the existing "foo.exe" from a backup location should the user choose to rollback the installation operation. Similar rules apply for all classes of installation operation and installation data (e.g., files, registry entries, shortcuts, etc.).

A binary format is preferably used for rollback script records instead of text because of efficiency, there is no need for parsing of text, and the binary format discourages manual editing of the rollback script records.

The data types that are preferably supported for rollback script records include NULL, integer, variable length string and variable length binary data. Exemplary rollback script data types and the length encoding are illustrated below:

| Data Type | Length Encoding |
| --- | --- |
| Null String (all types) | 0x8000 |
| 32-bit signed integer | 0x4000, integer value |
| Null Value | 0x8000 |
| Extended Size | 0xC000, 32-bit length, data array |
| Non-DBCS char string | lstrlenA( ), char array |
| DBCS char string | lstrlenA( ) + 0x4000, char array |
| Binary stream | Byte count + 0x8000, byte array |
| Unicode string | lstrlenW( ) + 0xC000, char array |

Preferably, all data in the rollback script records is typically stored as 16-bit integers in Intel byte ordering, with the exception of non-Unicode strings which are padded if necessary to a 16-bit boundary. The first 16-bit word of a rollback script record contains the opcode in the low byte and the argument count in the high byte as follows:

| Argument Count (high byte) | Operation Code (low byte) |
| --- | --- |

Preferably, each argument is preceded by a 16-bit word that specifies the data type and the length of the following argument data. The exact data representation depends upon the data type used. The maximum length of an argument is 16,383 characters. If ever a longer argument is required, the extended type value is placed in a length field followed by a 32-bit word containing the type bits as the highest bits.

Rollback script records are typically stored in a subfolder of a folder named "installer". The backup files that need to be saved as a part of "rollback", i.e., the files the current installation has overwritten or deleted, are stored in the config.msi folder on the root of each volume. By storing the backup files on the same volume on which they originally resided, the process of backing the files up is quick, because the files do not need to be physically moved anywhere. The "installer" folder is typically marked as both Hidden and System and on the Windows NT operating system, it is typically secured to give users read-only access. Should a folder of the same name exist off of the root, but not have the hidden and/or system attributes set, or security settings on the Windows NT operating system, the attributes and security settings are added to the folder. Rollback script record names are generated using an internal function in the preferred installer program module 37 that guarantees uniqueness. Rollback script record names have a randomly generated prefix, or first 8 characters, to which an extension of ".rbs" (for RollBackScript) is appended. The preferred installer program module then checks the proposed folder for a file with the same name and, if one exists, then a new 8 character prefix is generated and iterations continue until a unique name is obtained.

Backed-up installation data for rollback script records are stored in the same folder as the original ones, but are renamed using similar rules for naming rollback script records.

Enabling the Rollback Aspect

Preferably, by default, the rollback aspect of the preferred installer program module 37 is enabled for the duration of an installation operation, assuming there is enough disk space. As soon as the operation completes successfully, however, the corresponding rollback script and any backed-up installation data are purged. "Rollback" applies to all installation operations, such as installing an application program module, installing a feature locally, changing a feature from local to source, and uninstalling a feature.

Figure 6:
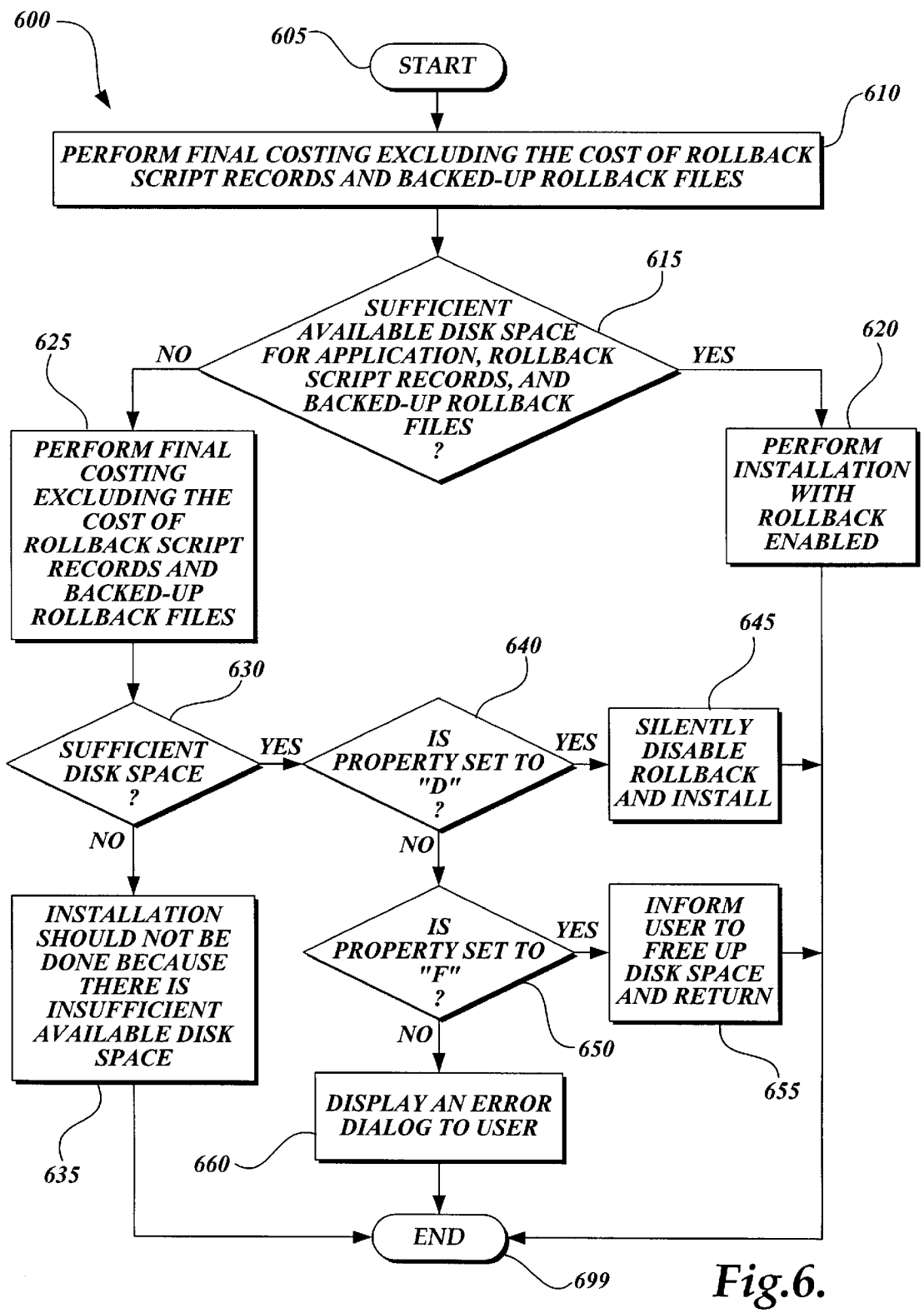
FIG. 6 is a flowchart illustrating a method for determining whether there is enough disk space to enable the rollback aspect.

Referring now to FIG. 6, a method 600 for determining whether there is enough disk space to enable the rollback aspect is illustrated in a flowchart. The method 600 starts at step 605 and proceeds to step 610. Final costing is performed at step 610. Final costing includes determining how much disk space (or cost) is needed to install the application program module being installed and the disk space (or cost) needed to store the rollback script records and backed-up rollback files (backed-up installation data). The method 600 then proceeds to decision step 615.

At decision step 615, it is determined whether there is sufficient disk space for installation of the application program module and for storage of the rollback script records and backed-up rollback files. If there is sufficient disk space, then the method 600 proceeds to step 620 and the installation of the application program module is performed with the rollback aspect enabled. The method then ends at step 699.

However, if at decision step 615 it is determined that there is insufficient disk space for installation of the application program module and storage of the rollback script records and backed-up rollback files, then the method 600 proceeds to step 625.

At step 625, final costing is performed excluding the cost of storage of the rollback script records and backed-up rollback files. The method 600 then proceeds to decision step 630.

At decision step 630, it is determined whether there is sufficient disk space for installation of the application program module with the rollback aspect disabled, i.e., absent the rollback script records and backed-up rollback files. If not, then the method 600 proceeds to step 635 and a dialog is displayed to the user informing the user that the installation of the application program module could not be performed because there is insufficient available disk space and the method ends at step 699.

However, if at decision step 635 it is determined that there is sufficient disk space for installation of the application program module with the rollback aspect disabled, then the method 600 proceeds to decision step 640.

At decision step 640, it is determined whether a PROMPTROLLBACKCOST property is set to the value "D". The PROMPTROLLBACKCOST property is a property that may be set by an application program module developer or system administrator to indicate whether installation operations may be performed with the rollback aspect of the installer program module disabled. If the PROMPTROLLBACKCOST property is set to "D", then the method proceeds to step 645. At step 645, the rollback aspect is silently disabled and the application program module is installed. The method 600 then ends at step 699.

However, if at step 640, it is determined that the PROMPTROLLBACKCOST property is not set to "D", then the method proceeds to decision step 650. At decision step 650, it is determined whether the PROMPTROLLBACKCOST property is set to "F". If the PROMPTROLLBACKCOST property is set to "F", then the method 600 proceeds to step 655. At step 655, a dialog informs the user to free disk space and retry the installation. The method then ends at step 699.

If, at decision step 650, it is determined that the PROMPTROLLBACKCOST property is not set to "F", then the method proceeds to step 660. At step 660, an error dialog is displayed to the user describing that the installation could not be completed and asking whether the user wishes to disable the rollback aspect. The method then ends at step 699.

Resuming an Unsuccessful or Aborted Installation

When an installation is cancelled or fails, an embodiment of the present invention allows a user to leave the installation in its present state and then finish the installation at a later time. This may be known as resuming an unsuccessful or aborted installation.

When the user chooses not to "rollback" an unsuccessful or aborted installation, then the rollback script records for the installation are saved. At a later time, when the user wishes to continue the installation, then a second set of rollback script records is generated and added to the backup folder where the rollback script records and backed-up installation data are saved. The two sets of rollback script records are associated through special registry key entries for each rollback script record. Each registry key typically contains a path to a rollback script record so that the record may be accessed and read. Each registry key also typically contains a time and/or date that the registry key was created because it is important to keep the rollback script records in proper order so that "rollback" may be performed. It should be understood that rollback script records are typically executed from the newest rollback script record to the oldest rollback script record.

It should be understood that there are typically three situations in which deciding whether to "resume" an installation or "rollback" an installation may be important. The first of these situations is if the user cancels the installation. A second situation is if the installer program module suffers a fatal error. A third situation is if the user's computer suffers an unrecoverable system crash.

In the case of a user-initiated cancel, rollback script records and backed-up installation data which are required to support resuming where the installation left off are preserved. Typically, a confirmation dialog is displayed to the user indicating they may cancel all and resume later, or continue installing. Users are typically given the opportunity to "rollback" at this point.

In the case of a fatal error of the installer program module, users are given the opportunity to "rollback". When the fatal error occurs, typically the user is given the option to retry the installation and the user may be given the option to ignore the error. However, once the user decides not to ignore the error, or that the retry is nor working, then the user must choose cancel on an error dialog box, at which point the user is warned that "rollback" is about to occur and then "rollback" occurs.

Rollback User Interface

Referring now to FIG. 7, the preferred user interface 700 displayed to the user when "rolling back" an installation operation is illustrated in a screenshot. The user interface 700 includes a rollback bar 705 with a number of level indicators 710. The level indicators 710 appear in the rollback bar 705 and are typically rectangles that are removed as the rollback operation is completed. When the rollback operation is completed, there are typically no level indicators 710 in the rollback bar 705.

Blocking

It should be understood that typically, if the rollback aspect of the present invention is to be enabled, a first installation of a first program module must be completed before a second installation of a second program module begins. This is because the two separate installations may affect the same files or other similar installation data. Thus, if two installations are being performed before either is complete, then the rollback scripts may cause system errors because "rolling back" one installation may incorrectly "rollback" a file or installation data that has been changed in another installation.

It should be understood therefore, that as soon as an installation complete, all rollback scripts and backed-up files for that installation are preferably deleted. Of course, in alternative embodiments of the present invention, rollback scripts and backed-up installation data may be saved so that an installation may be "rolled back" at any time after the initial installation.

Thus, from the foregoing description, it will be apparent to those skilled in the art that the present invention provides a method and system for restoring a machine to its original state should any configuration task terminate prematurely, either due to a failure or due to a user requested termination. It should be further understood that the present invention provides a method for resuming an installation of an application program at the point where the installation was previously canceled. Thus, it should be understood that the present invention may ease installations of products over slow links and products that are installed from many diskettes by allowing installations to be performed in a piecemeal fashion. It should be further understood that the present invention enables a safety window during which time network administrators may deploy applications, knowing they can back out and restore the state of the machines on the network should the need arise.

It should be understood that, in one embodiment, the present invention is generic for any installation. In other words, any installation written for the preferred installer program module 37 using native operations, rather than custom operations, will automatically have the rollback aspect enabled.

It should be understood that the preferred installer program module has a fine level of granularity. For example, application program modules may support on-demand installation of features. For these applications, some features are faulted in while others are faulted out. Each of these faulted in or faulted out actions is a type of installation or uninstallation and, thus, results in the generation of a rollback script and rollback script records.

It should be understood that although the present invention is described above with reference to installation of a program module, that the present invention also applies to other operations performed by the installer program module. For example, the rollback aspect may be used for installation, uninstallation and other transactions performed by the installer program module 37, such as advertised features, install on demand, and repair.

It will also be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system including an installer program module for installing an application program module using a plurality of installation script records, a method for creating rollback script records for restoring the electronic system to an original state, the method comprising the steps of:

analyzing an installation script record, wherein the installation script record corresponds to an installation operation; and in response to analyzing the installation script record, generating a rollback script record.

2. The method recited in claim 1, wherein the rollback script record comprises instructions for reversing the installation operation defined by the installation script record.

3. The method recited in claim 1, wherein the installation script record corresponds to an installation operation on installation data.

4. The method recited in claim 3, wherein the step of generating the rollback script record comprises the following steps:

determining whether a version of the installation data already exists on the electronic system; and if not, then storing a first set of instructions as the rollback script record, wherein the first set of instructions describes the steps necessary to reverse the installation operation of the installation script record.

5. The method of claim 4, further comprising the steps of:

if a version of the installation data already exists on the electronic system, then storing the existing installation data in another location on the electronic system; and storing a second set of instructions as the rollback script record, wherein the second set of instructions describes the steps necessary to copy the existing installation data to its prior location on the electronic system and steps necessary to reverse the installation operation of the installation script record.

6. The method of claim 5, further comprising the steps of:

determining whether the installation is complete;

if not, then analyzing the next installation script record and repeating the method.

7. The method of claim 6, further comprising the step of:

if the installation is complete, then purging all rollback script records and existing installation data from the electronic system.

8. A computer-readable medium having computer-executable instructions for installing a file on a computer and restoring the computer to its original state before the installation of the file, which when executed performs steps comprising:

installing the file on the computer;

storing on the computer an instruction describing uninstalling the file;

detecting an error in the installation of the file; and in response to detecting the error, executing the instruction.

9. The computer-readable medium of claim 1, further comprising instructions, which when executed perform the step of storing the instruction in a rollback script.

10. A user interface for use in association with an installer program module for installing an application program module onto a computer, wherein the user interface is displayed to a user and wherein the user interface comprises:

a rollback bar comprising a number of level indicators, wherein a level indicator is removed to indicate that the installer program module is restoring the computer to its state prior to the installer program module's installing the application program module.

11. The user interface of claim 10, wherein the level indicators are removed from the right side of the rollback bar until the level indicators are no longer displayed in the rollback bar, indicating that the computer has been restored to its state prior to the installer program module's installing the application program module.

12. The user interface of claim 10, wherein the level indicators are generally rectangular.

13. For a computer comprising an installer program module for installing an application program module using a plurality of installation script records and for creating rollback script records and backed-up rollback files for restoring the computer to an original state, a method for determining whether to enable or disable the aspect of creating rollback script records, the method comprising the steps of:

determining the cost of installing the application program module and the cost of storing the rollback script records and backed-up rollback files;

determining whether the cost of installing the application program module and the cost of storing the rollback script records and backed-up rollback files are greater than the available disk space of the computer; and if not, then installing the application program module while storing the rollback script records and backed-up rollback files.

14. The method of claim 12, further comprising the steps of:

if the cost of installing the application program module and the cost of storing the rollback script records and backed-up rollback files is greater than the available disk space of the computer, then determining the cost of installing the application program module;

determining whether the cost of installing the application program module is greater than the available disk space of the computer; and if so, then displaying a dialog box indicating that the application program module cannot be installed because there is insufficient available disk space.

15. The method of claim 12, further comprising the steps of:

if the cost of installing the application program module is not greater than the available disk space of the computer, then displaying a dialog box indicating that the application program module can be installed if the rollback script records are disabled;

receiving an indication to disable the rollback script records; and installing the application program module.

\* \* \* \* \*

UNITED STATES PATENT AND TRADEMARK OFFICE
CERTIFICATE OF CORRECTION

PATENT NO. : 6,363,499 B1
DATED : March 26, 2002
INVENTOR(S) : J.C. Delo et al.

It is certified that error appears in the above-identified patent and that said Letters Patent is hereby corrected as shown below:

Column 4,
Line 32, "unit 21 The" should read -- unit 21. The --

Column 5,
Line 15, "FIG. I" should read -- FIG. 1 --
Line 65, "uiistalled" should read -- uninstalled --

Column 8,
Lines 54-55, "wor-
　　　　　d.exe" should break -- word.-
　　　　　　　　exe --
Line 61, "QueryFeature_State" should read -- Query_Feature_State --

Column 15,
Lines 14-15, 25-26 and 33-34, "PROMP-
　　　　　　　　　　TROLLBACKCOST" should break -- PROMPT-
　　　　　　　　　　ROLLBACKCOST --

Signed and Sealed this

Fifteenth Day of October, 2002

*Attest:*

*Attesting Officer*

JAMES E. ROGAN
*Director of the United States Patent and Trademark Office*